Oct. 13, 1931.  L. SEKULSKI  1,826,832
CONVEYER FEEDING MECHANISM
Filed Oct. 4, 1929  6 Sheets-Sheet 1

INVENTOR
LEE SEKULSKI
By Paul, Paul & Moore
ATTORNEYS

Oct. 13, 1931.  L. SEKULSKI  1,826,832
CONVEYER FEEDING MECHANISM
Filed Oct. 4, 1929  6 Sheets-Sheet 2

INVENTOR
LEE SEKULSKI
By Paul, Paul Moore
ATTORNEYS

Oct. 13, 1931.  L. SEKULSKI  1,826,832
CONVEYER FEEDING MECHANISM
Filed Oct. 4, 1929    6 Sheets-Sheet 3

INVENTOR
LEE SEKULSKI
ATT

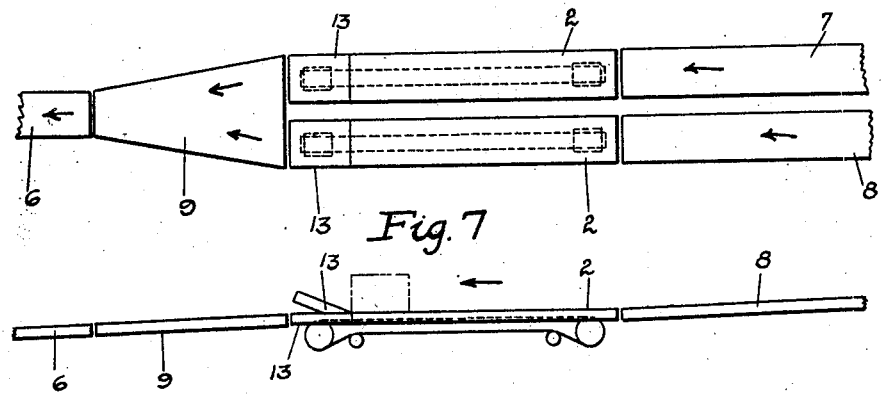
Fig. 7
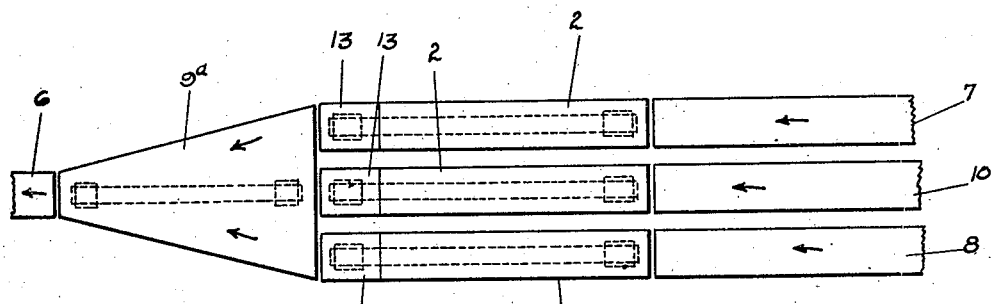
Fig. 8
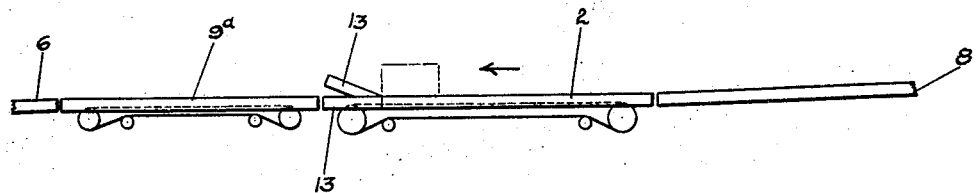
Fig. 9
Fig. 10

Oct. 13, 1931.  L. SEKULSKI  1,826,832
CONVEYER FEEDING MECHANISM
Filed Oct. 4, 1929   6 Sheets-Sheet 6

INVENTOR
LEE SEKULSKI
By
ATTORNEYS

Patented Oct. 13, 1931

1,826,832

UNITED STATES PATENT OFFICE

LEE SEKULSKI, OF ELLWOOD CITY, PENNSYLVANIA, ASSIGNOR TO MATHEWS CONVEYER COMPANY, OF ELLWOOD CITY, PENNSYLVANIA, A CORPORATION OF PENNSYLVANIA

CONVEYER FEEDING MECHANISM

Application filed October 4, 1929. Serial No. 397,420.

This invention relates to an improved feeding mechanism adapted to control the delivery of articles or packages from a plurality of delivery or auxiliary conveyers to a main conveyer.

An object of the invention is to provide a conveyer feeding mechanism operable in connection with a main conveyer and a plurality of delivery conveyers, for controlling the feeding of articles or packages from the delivery conveyers to the main conveyer, each delivery conveyer being provided with a feeding section comprising a set of anti-friction conveyer rollers having means for positively driving them at intervals to cause the delivery of one or more articles, which may be positioned thereon, to the main conveyer, and each feeding section being provided with a suitable stop means located at the discharge end thereof and adapted to interrupt the discharge of articles therefrom during the period when the driving means for the conveyer rollers of said section is out of driving engagement with the rollers, and the different feeding sections embodied in a given conveyer installation being so connected and timed as to cause them to operate, one at a time, to deliver one or more articles to the main conveyer, thereby preventing congestion at the junction between the main conveyer and said feeding sections.

Features of the invention reside in the constructional details of the feeding conveyer sections; in the arrangement of the hinged stop sections provided at the discharge end of each feeding section, and in the means provided for driving the anti-friction conveyer rollers of the feeding sections.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 5 is a plan view showing the gravity conveyer section connecting the feeding sections with the main conveyer;

Figure 6 is a detail sectional view showing the means for operating the hinged conveyer sections connected with the feeding sections;

Figure 7 is a diagrammatic plan view illustrating two delivery conveyers connected with the main conveyer;

Figure 8 is a view showing a side elevation of Figure 7;

Figure 9 is a view similar to Figure 7, showing three delivery conveyers;

Figure 10 is a view showing a side elevation of Figure 9;

Figure 13 is a cross sectional view on the line 13—13 of Figure 11; and

Figure 14 is a detail view illustrating the drive means for operating the anti-friction rollers of the feeding conveyer sections shown in Figure 11.

Figure 1:
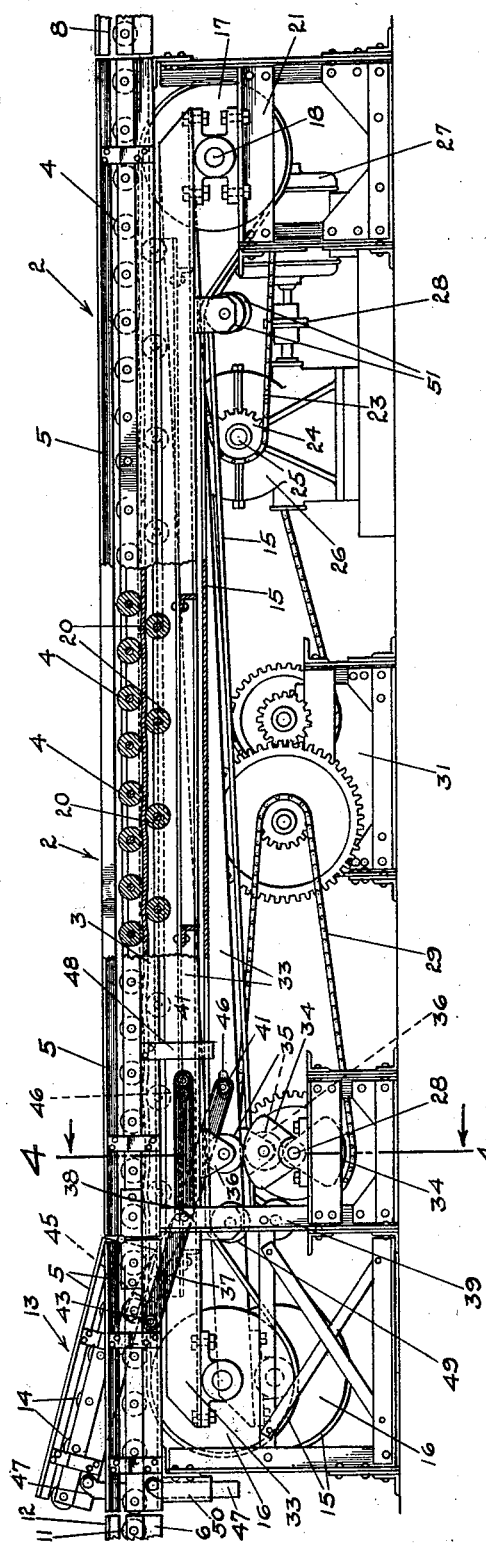
Figure 1 is an elevational view partially broken away to show the construction of the feeding conveyer sections.

The novel conveyer feeding mechanism disclosed in this invention comprises a plurality of feeding conveyer sections 2, each comprising side rails 3 having a plurality of anti-friction rollers 4 mounted thereon. Each feeding conveyer section is further provided with guard rails 5 for retaining the articles thereon when traveling thereover.

For the sake of explanation, there is diagrammatically illustrated in Figure 7, a main conveyer 6 which may lead to a warehouse or loading platform, or some other destination, and two delivery conveyers 7 and 8, over which the articles are conveyed from various stations to the main conveyer. The feeding conveyer sections 2 are interposed between the delivery conveyers 7 and 8 and a converging conveyer section 9 which connects the feeding sections with the main conveyer, as shown in Figures 7 and 8. The conveyer section 9 is here shown provided with a plurality of anti-friction rollers 11, over which the articles may travel by gravity from the feeding sections 2 to the main conveyer 6, as shown in Figure 5. Guard rails 12 guide the articles inwardly to the main conveyer 6, as shown.

A stop means is provided at the discharge end of each feeding section, and is here shown as consisting of hinged conveyer section 13, adapted to be tilted upwardly as best shown in Figure 1. These hinged sections 13 are also provided with a plurality of anti-friction rollers 14 adapted to support the articles as they travel from the feeding sections onto the converging section 9, connecting the feeding sections with the main conveyer.

Figure 2:
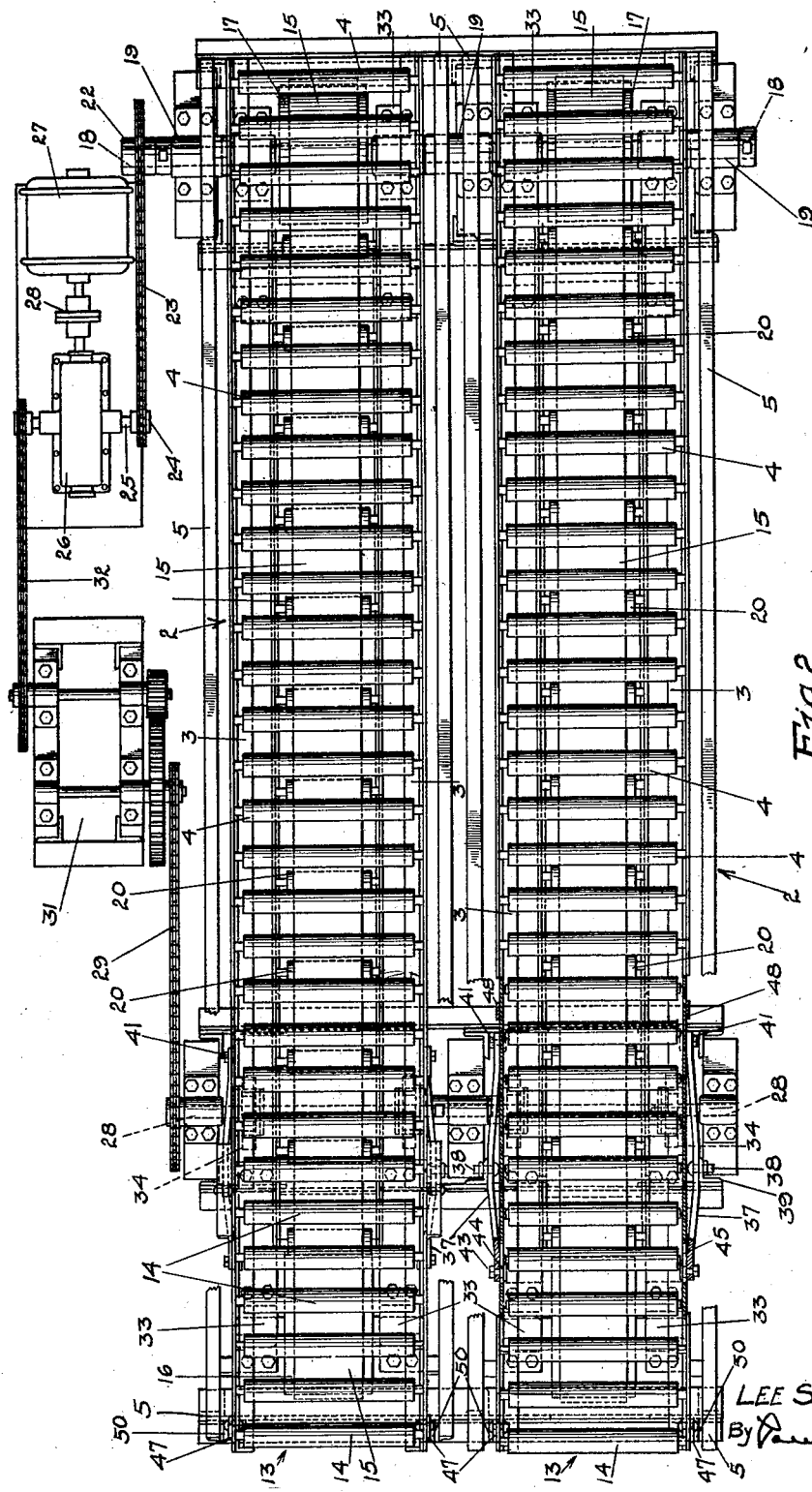
Figure 2 is a plan view of Figure 1, showing two feeding sections.

The feeding conveyer sections 2 are preferably horizontally disposed as shown in Figures 1 and 8, while the delivery conveyers 7 and 8 connected therewith are preferably of the gravity roller type so that articles may travel thereover by gravity. To discharge the articles from the feeding sections 2, each such section is provided with means for frictionally driving the rollers 4 thereof. Such means consists of a drive belt 15 mounted upon suitable pulleys 16 and 17, as shown in Figures 1 and 2. The drive pulley 17 is here shown secured to a drive shaft 18 mounted in suitable bearings 19 secured to the frame 21 supporting the feeding sections. A sprocket 22 is shown secured to one end of the drive shaft 18 and has a suitable chain 23 operatively connecting it with a smaller sprocket 24, secured to a shaft 25 of a speed reducer 26. This reducer may be of ordinary construction. The reducer 26 is operatively connected to a motor 27 by means of a flexible coupling 28 (see Figure 2). In operation, the drive belts 15 operate continually.

Figure 4:
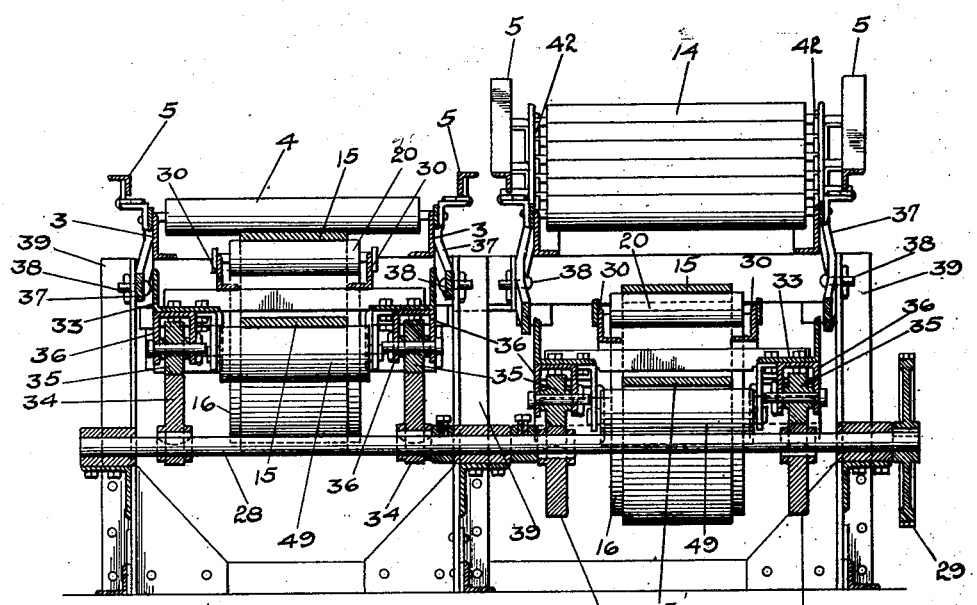
Figure 4 is a cross sectional view on the line 4—4 of Figure 1.

The means provided for moving the drive belts 15 into and out of driving engagement with the anti-friction rollers 4 of their respective feeding sections 2, is shown in Figures 1, 2, and 4, and comprises a cam shaft 28 rotatably mounted in suitable bearings provided on the frame supporting the feeding conveyer sections, as best shown in Figure 4. To obtain the proper speed for the cam shaft 28, the latter is here shown driven by a chain drive 29 from a reduction gear mechanism 31, having a chain drive 32 connecting it with the speed reducer 26 as best shown in Figure 2.

Figure 3:
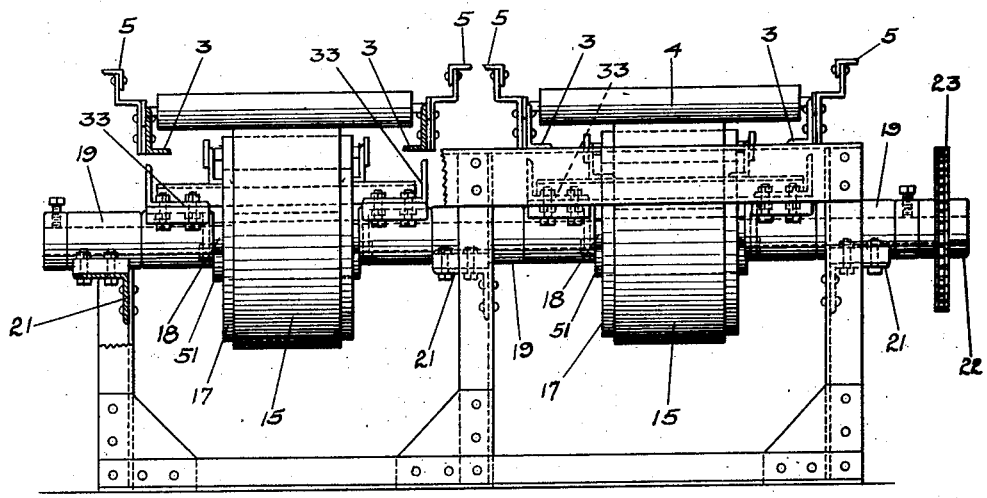
Figure 3 is an end view of Figure 1, partially broken away.

In Figures 2, 3, and 4, two feeding conveyer sections are shown adapted for alternate operation as will subsequently be described. As the feeding conveyer sections and their operating mechanisms are of like construction, but one will be described in detail.

Referring to Figure 1, it will be noted that the idler pulley 16 supporting the drive belt 15, is mounted in a frame 33 having one end pivotally supported as, for example, upon the drive shaft 18, and its opposite end adapted for vertical movement. The means for intermittently vertically moving the frame 33 is shown in Figures 1, 2, and 4, and consists of spaced cams 34 secured to the cam shaft 28 and each engaged by an anti-friction roller 35 mounted in suitable brackets 36, here shown secured to the lower faces of the side beams of the movable frame 33. Because of this construction, the one end of the frame 33 will be intermittently raised and lowered during operation of the feeding mechanism, thereby causing the upper runs of the drive belt 15, which is supported upon anti-friction rollers 20 mounted on spaced side rails 30, secured to the frame 33, to be alternately moved into and out of frictional driving engagement with the anti-friction rollers 4, constituting the carrying portion of the feeding conveyer section 2. In Figure 1, the drive belt 15 is shown, in full lines, operatively engaged with the conveyer rollers 4. In this same figure, it will be noted that the frame 33 of an adjacent feeding section is shown in its lower position.

As hereinbefore stated, the feeding sections 2 are adapted to be operated one at a time, so that when the conveyer rollers 4 of one section are being driven by their complemental drive belt 15, to discharge an article onto the converging conveyer section 9, the rollers 4 of the other section will be out of driving engagement with their complemental belt 15, and the hinged stop section 13 of the inoperative section 2 will be tilted upwardly, as shown at A in Figure 1, to prevent articles from accidentally being discharged therefrom.

The means provided for operating each stop section 13 is here shown as consisting of a pair of arms 37 supported upon pivots 38 provided in the uprights 39 of the frame supporting the feeding sections. On end of each arm 37 is movably connected with the side rails of the frame 33, as indicated at 41 in Figure 6, while the opposite end of each arm 37 is similarly connected to the side rails 42 of the hinged sections 13, as indicated at 43 in Figure 6. In the drawings, I have shown the connections between the arms 37 and the frame 33 and hinged section 13 as comprising anti-friction rollers 44 terminally mounted on the arms 37 and adapted to roll in elongated apertures or slots 45 and 46 provided respectively in the side rails 42 of the hinged section 13 and the side rails of the frame 33. The movable connections between the ends of the arms 37 and the side rails of the hinged section 13 and frame 33 may be varied in numerous ways without departing from the scope of the invention.

The outer end of each hinged section 13 is preferably provided with depending members 47 mounted to slide in guides 50. These members and guides cooperate to vertically guide the swingable end of the section 13, as it is vertically moved with respect to its complemental feeding section 2. Guide members 48 are also provided upon the side rails 3 of each feeding section 2 adapted to guide the lower frame 33 in its movement with respect to the side rails 3 of the feeding section.

The lower run of the drive belt 15 preferably passes over idlers 49 and 51 supported upon the side rails of the frame 33, as best shown in Figure 1.

In the operation of this novel feeding mechanism, the articles are delivered to the feeding sections 2 from the delivery conveyers 7 and 8. The drive belts 15 of the two feeding sections 2, assuming that but two delivery conveyers are connected with the main conveyers 6, as shown in Figure 7, are so arranged that when one of said belts is moved into driving engagement with its complemental set of conveyer rollers 4, the other belt will be out of engagement with the rollers of its complemental feeding section, thereby causing the articles delivered to one of the feeding sections to be discharged onto the main conveyer, while movement of the articles positioned on the other of said sections will be interrupted because of the inclined position of the hinged stop section 13 provided at the discharge end thereof.

By reference to Figure 4, it will be noted that the cams 34 of each feeding section 2 are oppositely disposed upon the cam shaft 28, thereby causing the drive belts 15 to be alternately moved into and out of driving engagement with the anti-friction rollers of the conveyer sections 2, as above described.

When three, or more, delivery conveyers 7, 8, and 10 are used, as in Figure 9, the hinged stop sections 13 and drive belts 15 are operated, one at a time, as described with reference to Figure 7. This is accomplished by the use of properly shaped cams 34, spaced equi-distant apart circumferentially of the shaft 28 as, for example, when three delivery conveyers are used, the circumferential spacing of the cams 34 will be approximately 120°.

The hinged stop sections 13 provided at the discharge ends of the feeding sections 2, are operated by movement of the vertically movable frames 33 supporting the drive belts 15. This results because of the arrangement of the pivoted arms 37 and their connections with the hinged sections 13 and frames 33. Each pair of arms 37 is so arranged that when the frame 33, to which they are connected, is in its lower inoperative position, its complemental hinged section 13 will be tilted upwardly, as shown at A in Figure 1, and when the frame 33 is moved upwardly to move the belt 15 into driving engagement with the rollers 4, the hinged section 13 will be moved to a horizontal position to permit the articles supported upon the feeding conveyer section to be discharged therefrom onto the converging conveyer section 9, over which they may travel by gravity onto the main conveyer 6, which may also be of the usual gravity type.

By thus operating the feeding conveyer sections 2, one at a time, as above described, congestion of the articles or packages at the receiving end of the main conveyer is prevented.

When three or more delivery conveyers connect with one main conveyer, the conveyer rollers 11 of the converging conveyer section 9a may be positively driven, as hereinbefore stated, by the use of a belt 85, supported upon suitable rollers or pulleys 86 and 87, mounted beneath the conveyer rollers 11 of the section 9a and arranged to frictionally engage said rollers to provide a drive therefor. The belt 85 may be driven from the shaft 88, supporting the pulley 16, by a suitable means, such as the drive belt 89 diagrammatically indicated in Figure 9.

Figure 11:
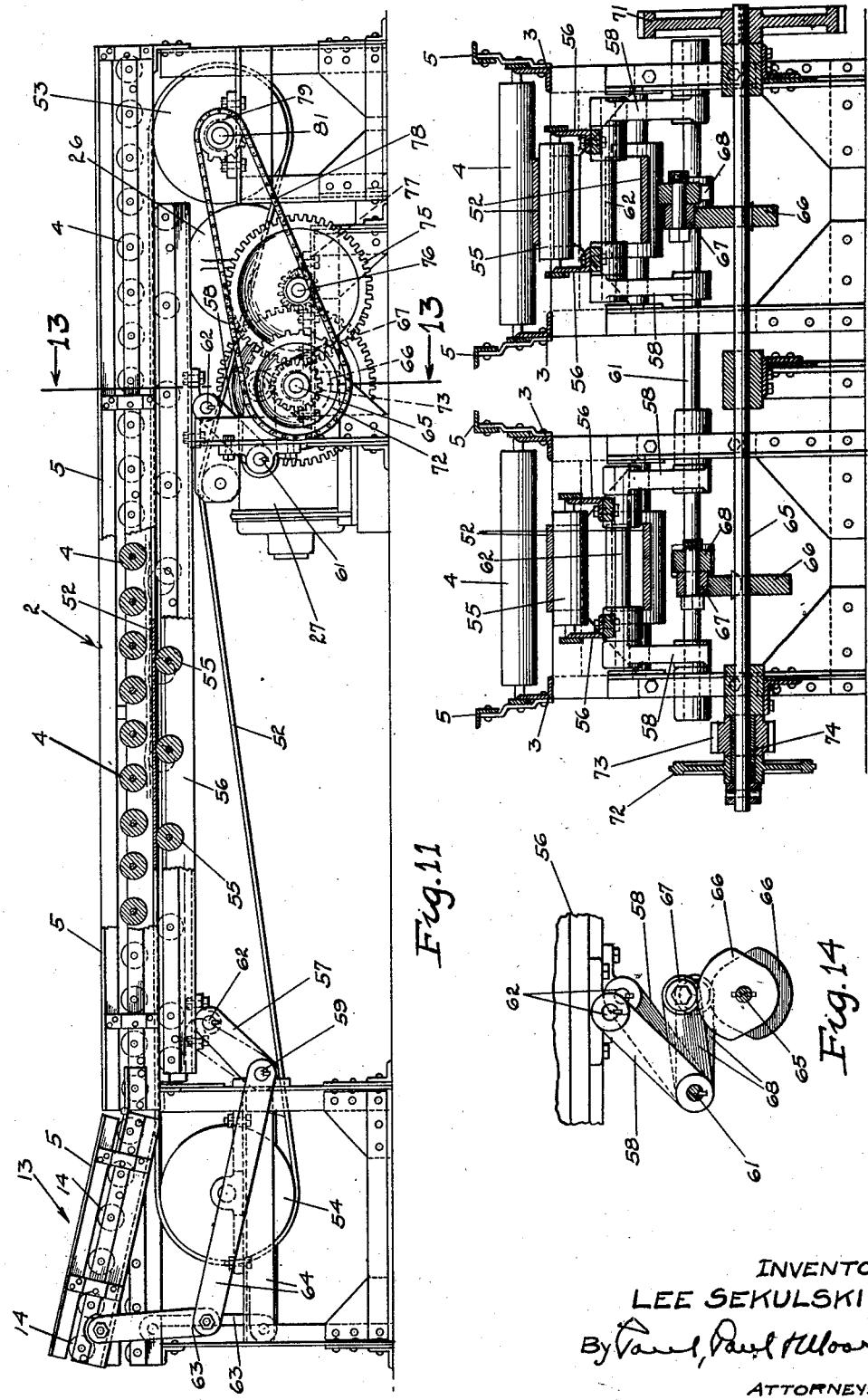
Figure 11 is a view similar to Figure 1, showing a modified construction.

Figures 11, 12, 13, and 14 illustrate a modified form employing a drive belt 52 supported upon a drive pulley 53 and an idler pulley 54. The upper run of the drive belt 52 is normally out of driving engagement with its complemental anti-friction rollers 4 of the feeding conveyer section 2, but is adapted to be moved into driving engagement therewith by means of a plurality of rollers 55 mounted in a frame 56 supported upon parallel links 57 and 58 secured respectively to shafts 59 and 61, as best shown in Figure 11. Cross members or rods 62 are secured to the swinging ends of the parallel links 57 and 58, upon which the frame 56 is mounted.

Each hinged conveyer section 13, shown in Figure 11, is operatively connected with one of the shafts 59 by means of links 63 and arms 64, the latter each having one end secured to one of the shafts 59. Thus, when each frame 56 is moved upwardly by swinging movement of the parallel links 57, upon which it is supported, the arms 64 connected therewith will swing downwardly, thereby causing the hinged section 13 to be moved to a horizontal position, and permitting articles supported upon the feeding conveyer section 2, to be discharged therefrom onto the converging section 9, from which they are delivered to the main conveyer 6.

The frames 56 are here shown operated from a cam shaft 65 mounted in suitable bearings provided on the frame supporting the feeding conveyer sections 2. Cams 66 are secured to cam shaft 65, one for each frame 56. Each cam is adapted to be engaged by a roller 67 secured to an arm 68 suitably secured to the shaft 61 to which the parallel links 58 are secured. The two cams 66 are oppositely disposed upon the shaft 65 so that when one frame 56 moves upwardly, the others will move downwardly, as shown in Figure 13.

Figure 12:
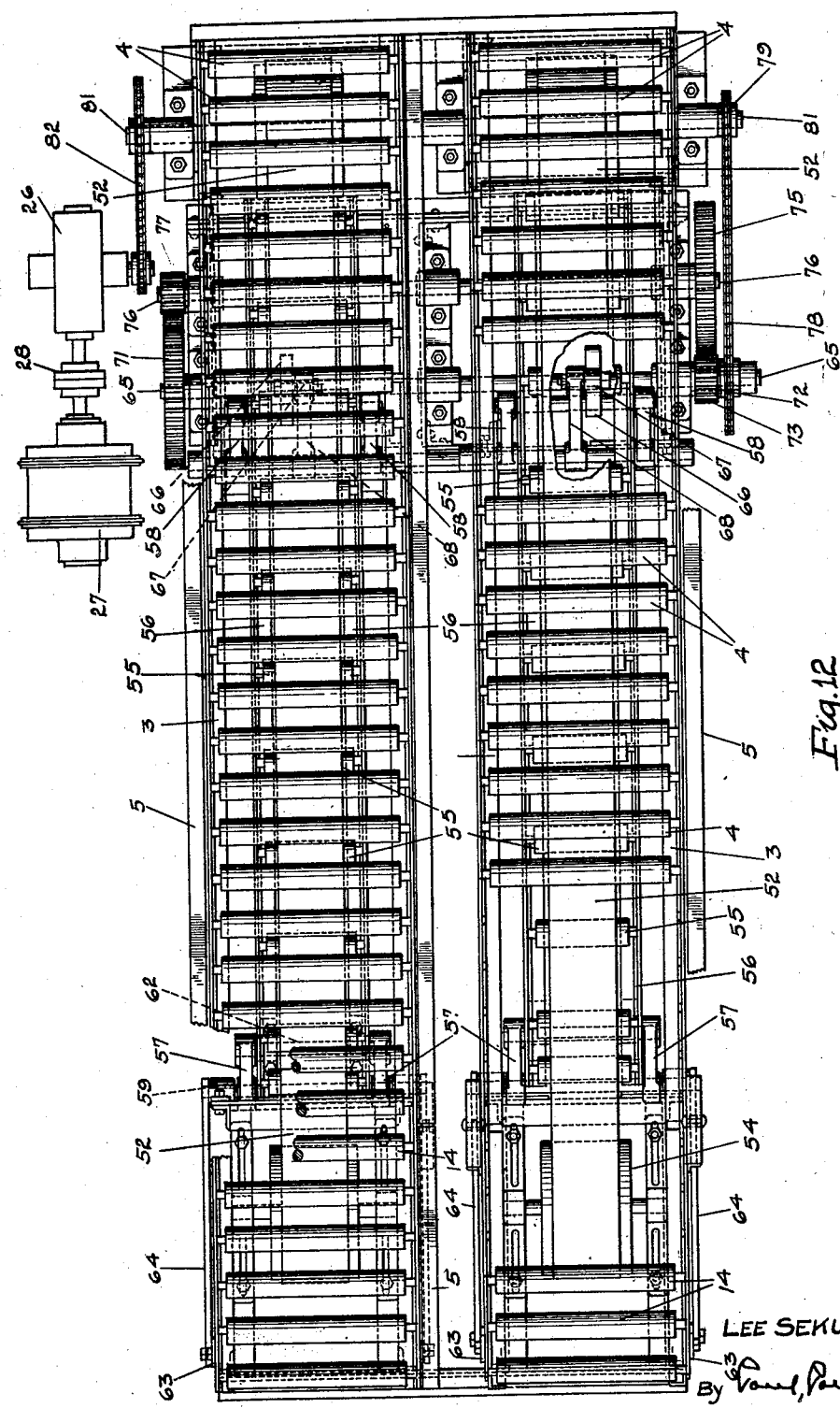
Figure 12 is a plan view of Figure 11, partially broken away.

The cam shaft 65 is provided at one end with a suitable gear wheel 71 which is fixedly secured thereto. A sprocket 72 and pinion 73 are provided at the opposite end of the cam shaft 65 and are fixedly mounted upon a sleeve 74, which, in turn, is rotatably mounted upon the shaft 65. A gear 75 is shown secured to one end of a shaft 76 and meshes with the pinion 73. At the opposite end of the shaft 76, a pinion 77 is mounted which meshes with the gear 71 secured to the cam shaft 65. A chain 78 operatively connects the sprocket wheel 72 with a relatively smaller sprocket 79 terminally secured to one end of a shaft 81, the opposite end of which has a chain drive 82 connecting it with a speed reducer 26, similar to the one shown in Figure 2, which is operatively connected with a motor 27 by means of a flexible coupling 28. The operation of the mechanism shown in Figures 11, 12, and 13, is similar to that shown in the previous figures with the exception that the drive belts 52, supported upon the frames 56, are moved into and out of driving engagement with the conveyer rollers 4 of their complemental feeding conveyer sections 2, by oscillation of the parallel links 57 and 58, while the frames 33, shown in Figures 1 and 2, are mounted for swinging movement.

In the drawings, I have shown the feeding mechanism operated by a motor and suitable speed reducer, but obviously the mechanism may be operated from some other source of power without departing from the scope of the invention.

I claim as my invention:

1. In combination, a main conveyer, a plurality of feeding conveyers, means for actuating said feeding conveyers, one at a time, and a stop means on each feeding conveyer adapted to allow passage of articles to the main conveyer when a feeding conveyer is conditioned for feeding articles, but operative to arrest passage of articles from the feeding conveyers when the latter are in non-feeding condition.

2. The combination with a main conveyer and a plurality of delivery conveyers, of a feeding conveyer positioned in operative relation to each delivery conveyer, means for actuating said feeding conveyers, one at a time, to render them capable of feeding articles to the main conveyer, a stop member operatively connected with each feeding conveyer, and means for causing said stop members to arrest passage of article from the feeding conveyers when the latter are in non-feeding condition.

3. The combination with a main conveyer and a plurality of delivery conveyers, of a feeding conveyer interposed between each delivery conveyer and said main conveyer, means for operating said feeding conveyers, one at a time, to control feeding of articles to said main conveyer, and each feeding conveyer including a pivoted stop member adapted to interrupt the discharge of articles therefrom, when said feeding conveyers are in non-feeding condition.

4. The combination with a main conveyer and a plurality of delivery conveyers, of a feeding conveyer interposed between each delivery conveyer and said main conveyer, a tiltable stop member at the discharge end of each feeding conveyer adapted to be moved to inclined positions to temporarily interrupt the travel of articles passing over their respective feeding conveyers, and means for actuating said tiltable members, one at a time, and simultaneously actuating said feeding conveyers to operate to feed articles to the main conveyer, one at a time.

5. The combination with a main conveyer and a plurality of delivery conveyers, of a feeding section positioned in operative relation to each delivery conveyer and comprising a plurality of anti-friction rollers, means operatively connecting the discharge ends of all of said feeding sections with said main conveyer, a stop member at the discharge end of each feeding section adapted to prevent the discharge of articles from said feeding sections when said feeding sections are inoperative, and means for operating said feeding sections, one at a time, to render them capable of feeding articles therefrom to said main conveyer, and at the same time operating the corresponding stop members to positions to allow articles to pass thereover.

6. The combination with a main conveyer and a plurality of delivery conveyers, of a feeding section positioned in operative relation to each delivery conveyer and each comprising a plurality of conveyer rollers adapted to support articles passing thereover, an independent drive means for the conveyer rollers of each feeding section, a hinged portion at the discharge end of each feeding section adapted to be swung upwardly at intervals to arrest the passage of articles from said feeding sections, means for moving the drive means of each feeding section into and out of driving engagement with its complemental conveyer rollers, and means for simultaneously actuating said hinged portions to control the discharge of articles from the feeding sections.

7. The combination with a main conveyer and a plurality of delivery conveyers, of a feeding section positioned in operative relation to each delivery conveyer and each including a plurality of conveyer rollers adapted to support articles passing thereover, each feeding section having a hinged portion at the discharge end thereof, means for tilting said hinged portions to inclined positions to prevent articles from being discharged from said feeding sections, an independent drive means for the conveyer rollers of each feeding section, and each of said drive means being operatively associated with the hinged stop portion of its respective feeding section whereby, when one of said hinged portions is in inclined position to prevent the discharge of articles from its complemental feeding section, the drive means of said section will be out of driving engagement with the rollers thereof, and when said hinged portion is in a horizontal position to prevent passage of articles thereover, said drive means will drive said rollers to cause an article positioned on the feeding section to be discharged therefrom.

8. The combination with a main conveyer and a plurality of delivery conveyers, of a feeding section positioned in operative relation to each delivery conveyer and each including a plurality of conveyer rollers adapted to support articles passing thereover, a drive belt mounted beneath the rollers of each feeding section adapted to be moved into and out of driving engagement with said rollers, a stop means on each feeding section adapted to allow passage of articles to the main conveyer when a drive belt is engaged with the rollers of a feeding section, and means for actuating said drive belts and their complemental stop means whereby, when a stop means is moved to a position to permit the passage of an article thereover, the drive belt associated therewith will be moved into driving engagement with the rollers of the corresponding feeding section, thereby causing the articles to be fed from the feeding section to the main conveyer.

9. The combination with a main conveyer and a plurality of delivery conveyers, of a feeding section positioned in operative relation to each delivery conveyer, a converging conveyer section for conveying articles from the feeding sections to the main conveyer, each feeding section including a set of conveyer rollers adapted to support articles passing thereover, a frame movably supported beneath each set of rollers and each supporting a drive member adapted to be moved into and out of driving engagement with the conveyer rollers of a feeding section, a stop means at the discharge end of each feeding section operatively associated with the corresponding movable frame whereby, when said frame is moved in one direction, the drive member supported thereon will cause the conveyer rollers of a feeding section to operate to discharge articles therefrom, and at the same time will cause the corresponding stop means to be operated to permit the discharge of articles from the feeding section being operated.

10. The combination with a main conveyer and a plurality of delivery conveyers, of a feeding section positioned in operative relation to each delivery conveyer, a converging conveyer section for conveying articles from all of said feeding sections to the main conveyer, each feeding section including a set of anti-friction conveyer rollers adapted to support articles passing thereover, a frame movably supported beneath each such set of rollers and each supporting a flexible drive belt adapted to be moved into frictional driving engagement with a set of said conveyer rollers, and a stop means at the discharge end of each feeding section each operatively related to a corresponding movable frame, said stop means being adapted to be moved to positions to permit the discharge of articles from said feeding sections when the latter are operated by said drive belts, one at a time, to discharge articles, and to be moved to positions to prevent the discharge of articles from the feeding sections when the latter are not being operated by said drive belts.

In witness whereof, I have hereunto set my hand this 27th day of August 1929.

LEE SEKULSKI.